Aug. 11, 1970  J. A. McWAID  3,524,131
HIGH SPEED FREQUENCY COMPUTING APPARATUS
Filed Sept. 25, 1967  2 Sheets-Sheet 1

INVENTOR
JOHN A. McWAID
BY Nilsson & Robbins
ATTORNEYS

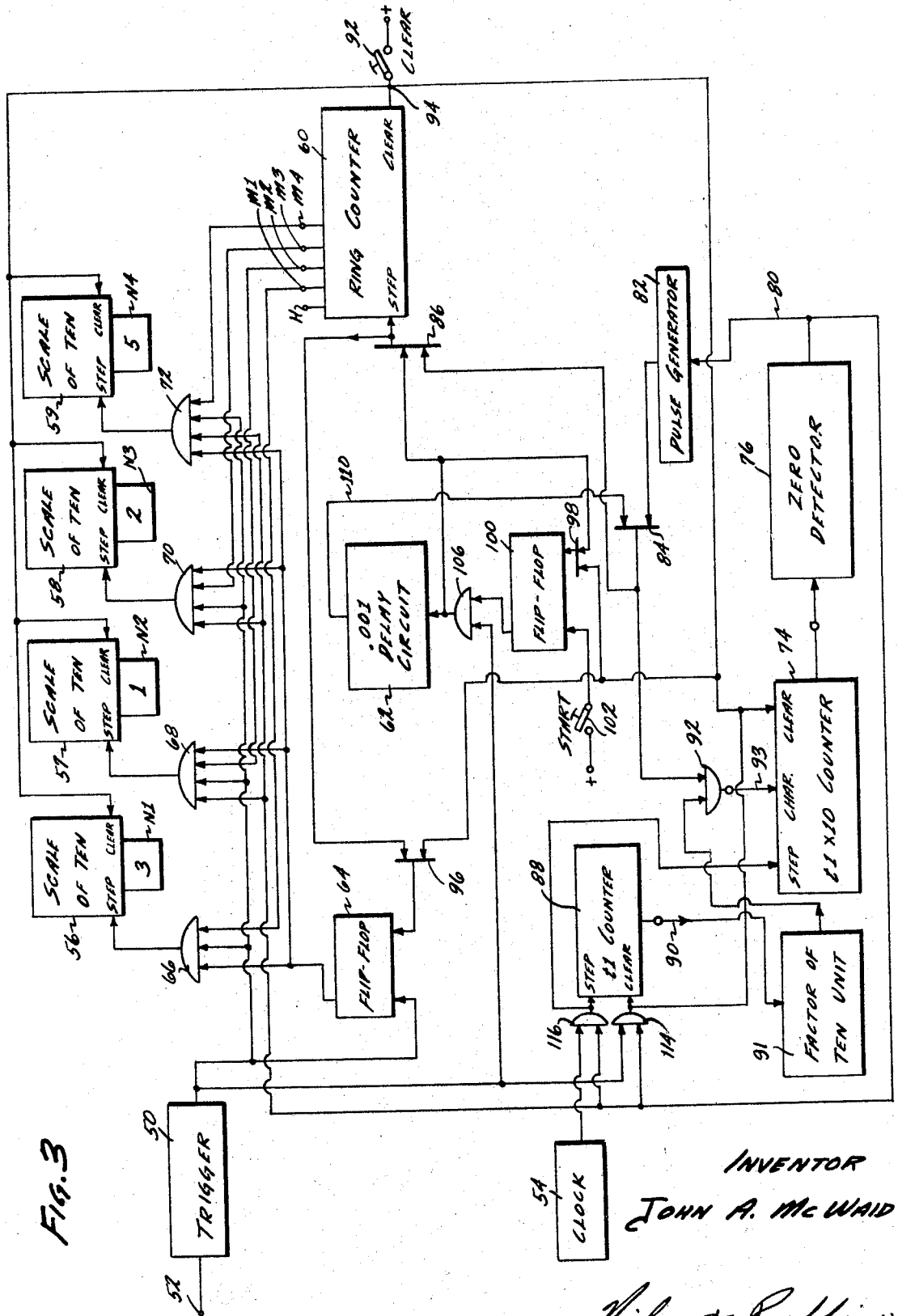

United States Patent Office 3,524,131
Patented Aug. 11, 1970

3,524,131
HIGH SPEED FREQUENCY COMPUTING APPARATUS
John A. McWaid, 211 S. Larchmont Blvd., Los Angeles, Calif. 90004
Filed Sept. 25, 1967, Ser. No. 670,068
Int. Cl. G01r 23/02
U.S. Cl. 324—78                    5 Claims

ABSTRACT OF THE DISCLOSURE

The system senses and registers the number of full cycles occurring in an electrical signal during a predetermined interval. The fragment of a cycle otherwise unaccounted for is also sensed and utilized to extend the significant digits of observation. One exemplary system manifests the fragment of a cycle as a fraction while another illustrative system provides additional digits in the observed value. In the latter system a cyclic operation is employed to sequentially develop the decimal digits in an inverse order of significance, which digits manifest the cycles of the observed signal occurring during given intervals of time.

BACKGROUND AND SUMMARY OF THE INVENTION

A technique that is widely employed in various electronic data-processing systems involves observing a number of cycles occurring in a signal over a predetermined interval of time. Such a technique is employed in a variety of different instruments, for example, certain forms of counters, converters and digital frequency meters.

Considering the digital frequency meter as an illustrative example, such instruments are well known in which a counter is advanced by each cycle of the signal under observation during a predetermined interval. Although an interval of one full second is normally quite impractical, it is apparent, that if the cycles of the signal are counted for a full second, at the conclusion of the interval the counter will register the frequency of the observed signal in cycles per second. Of course, depending upon the frequency of the signal under observation, the interval of observation is normally directly related to the accuracy of the instrument. For example, the observation of a thirty cycle/second signal for one second will not measure a deviation of say one-quarter or one-half cycle. If, however, the interval of observation were extended two seconds, the occurrence of sixty-one cycles would be registered to indicate a frequency of 30.5 cycles/second.

In most instances, it is desirable for electrical instrumentation systems to operate very rapidly. Therefore, in view of the considerations set forth above, the design of digital frequency meters normally involves a compromise between accuracy and speed-of-operation. As the operating interval of the instrument is reduced, accuracy of the instrument is also reduced. Therefore, a considerable need exists for a system capable of rapid operation without a substantial compromise in accuracy.

In general, the present system contemplates a digital counter controlled to operate for precise intervals of time. During such intervals, the counter tallies not only the full cycles of the observed signal but additionally tallies the fragmentary cycle to provide a more-significant measurement. In a sophisticated form, the system is capable of providing a decimal output, during operating intervals reduced by two orders of magnitude of typical systems as described above.

BRIEF DESCRIPTION OF THE DRAWINGS

In the drawings, which constitute a part of this specification, exemplary embodiments demonstrating various objectives and features hereof are set forth as follows:

FIG. 3 is a schematic diagram of another system constructed in accordance with the principles of the present invention.

Figure 1:
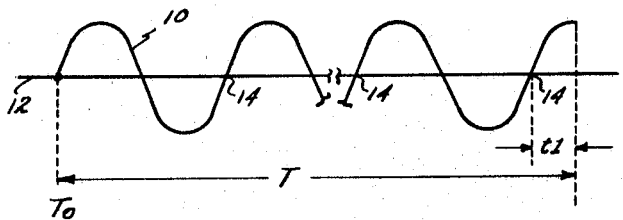
FIG. 1 is a graphic representation of a waveform illustrative of the operation of the system hereof.

Referring initially to FIG. 1, there is shown a sinusoidal waveform 10 representative of an electrical signal oscillating about a reference level 12. The frequency of the represented signal may be determined by initiating a counting operation at the instant T0 and advancing the count each time the signal progresses positively above the reference level 12, as indicated at the junction 14. Thus, the frequency of the signal is indicated as, the number of counts per interval T. However, such an observation does not account for the interval of the signal 10 occurring during the period $t1$, which includes approximately ¼ cycle of the signal. Depending upon the total period of the interval T, and the frequency of the signal represented by the waveform 10, one-quarter cycle unmeasured may contribute a very significant error. Accordingly, the philosophy of the present invention involves observing the signal represented by the waveform 10 throughout the full interval T (including the fractional cycle occurring during time $t1$) to provide an accurate measurement of the frequency during a short interval of time.

The waveform 10 of FIG. 1 is represented to be in a sinusoidal form; however, it is to be understood that the present system may be adapted for use with signal manifestations of virtually any form. For example, this system may be operated as a pulse counter, as a frequency meter, and so on.

Preliminary to considering the illustrative systems exemplary of the present invention, certain relationships may be somewhat helpful. Specifically, the measurement of frequency as considered above, is based upon the relationship:

$$\text{Frequency} = \text{Number of counts/time}$$

Thus, it may be seen that resolution or accuracy can be improved either by counting for a longer interval of time or by increasing the frequency of the observed signal. Both techniques have been employed in the past.

Another pertinent relationship exists between frequency (as measured in cycles per second) and signal period (as measured in seconds for example). In this regard, frequency and period bear a reciprocal relationship; specifically:

$$\text{Frequency} = 1/\text{period}$$

Therefore, the observation of either the period of one cycle in a signal, as a time measurement, or the number of cycles of a signal over a predetermined time interval may be observed to indicate frequency. Furthermore, the number of full cycles in an electrical signal may be observed as one indication of frequency, then a fragmentary cycle may be observed as a lesser indication for combination with the other indication. Alternatively, as disclosed herein, the fragmentary cycle may be expanded to produce an accurate observation of frequency, manifest by an increased number of digits. Such a technique involves sensing the cycles during a predetermined interval of time, expanding the fractional cycle by a factor of the radix and counting additional cycles in the observed signal. Identifying each separate count by the series N1, N2, N3 and so on and each separate time interval by the symbols T1, T2, T3 and so on frequency may be effectively observed, as:

$$F=N1/T1+N2/T2+N3/T3 \ldots$$

Figure 2:
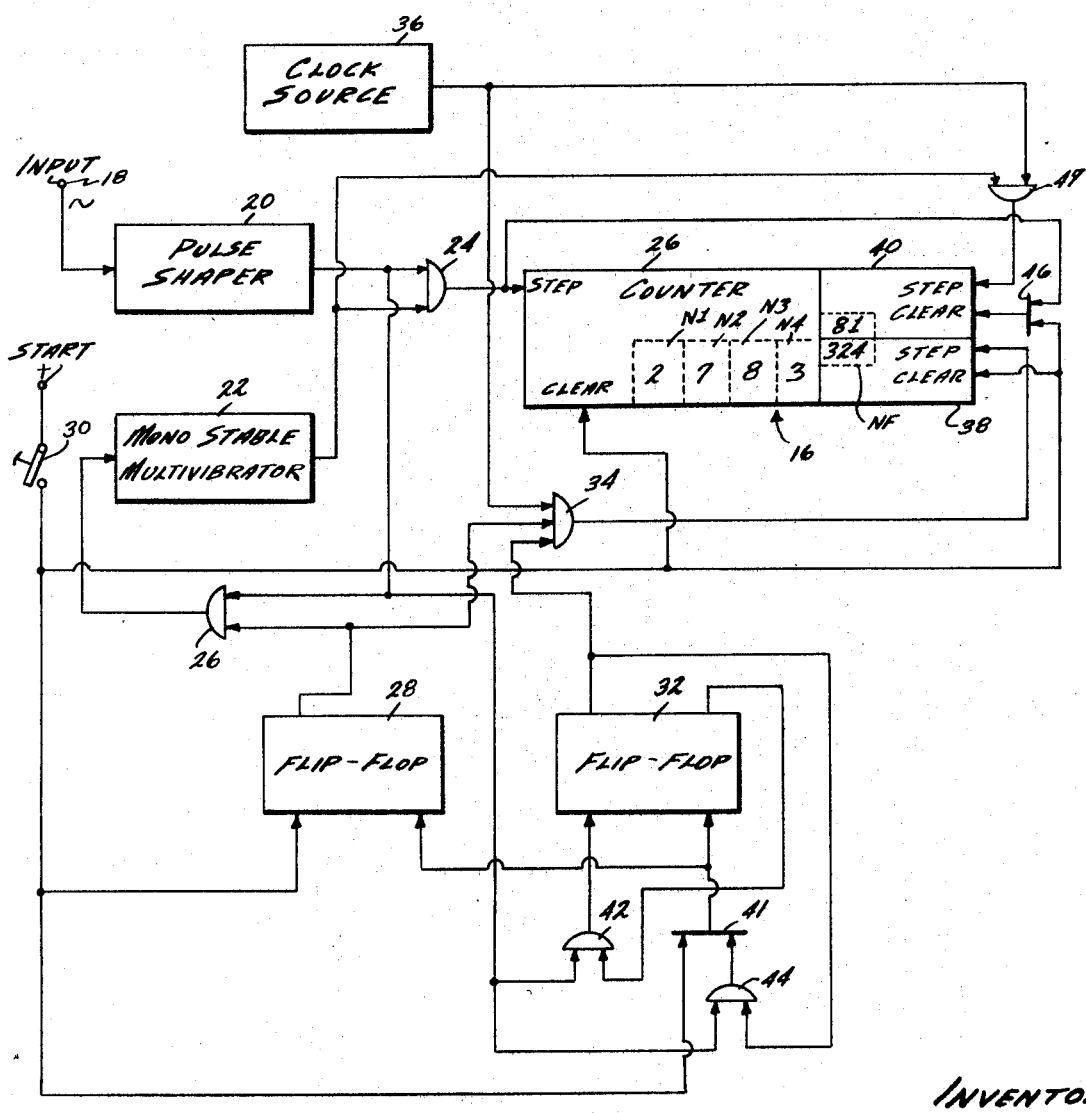
FIG. 2 is a schematic diagram of a system constructed in accordance with the principles of the present invention.

A somewhat-simpler preliminary embodiment hereof is shown in FIG. 2 and operates to provide digital frequency readings in the form of several digits and a fraction. Specifically, for example, a panel 16 is represented to indicate frequency measurements as four significant decimal digits N1, N2, N3 and N4 and a fraction NF. In the example outlined in detail below, the system operates to sense and manifest a frequency of 2,783 and 81/324 cycles per second, as indicated in the drawing.

The structure represented in FIG. 2 includes an input terminal 18 for receiving of the signal to be observed. In this embodiment, the observed signal is contemplated to be generally sinusoidal. The terminal 18 is connected to a pulse shaper which may comprise a well-known element generally known as a Schmitt trigger. Functionally, the pulse shaper 20 provides an output pulse having a leading edge coinciding to an arbitrary boundary between cycles in the signal applied at the input terminal 18. That is, each pulse from the pulse shaper 20 indicates the completion of one cycle and the beginning of another.

The operation of this system of FIG. 2 is based upon a pre-established interval which is defined by a monostable multivibrator 22 as well known in the prior art. Functionally, upon receiving an input pulse, the monostable multivibrator 22 provides a high level output signal for a predetermined interval of time. That interval is the period during which cycles of the input signal (as manifest by pulses from the shaper 20) are counted to provide one indication of frequency.

The pulse shaper 20 and the multivibrator 22 are connected to an "and" gate 24, a well-known component of binary electrical systems. Functionally, the gate 24 passes a high level signal to the "step" input of a counter 26, when all inputs to the gate 24 are in a high state. Thus, during the period when the monostable multivibrator 22 provides a high output, each pulse from the pulse shaper 20 passes through the gate 24 to advance the counter 26. The number of full cycles observed over a predetermined interval of operation is manifest as the digits N1, N2, N3 and N4 on the panel 16 of the counter 26. However, as indicated above, this system additionally accounts for any partial cycle lying within the predetermined time interval to manifest a fractional digit NF, as indicated.

In the operation of the system, the monostable multivibrator 22 is set precisely at the beginning of a signal cycle. This operation is accomplished by utilizing the leading edge of the pulse from the shaper 20 to initiate the operation of the multivibrator 22. Immediately after the occurrence of such a leading edge, the predetermined time interval is started with the qualification of an "and" gate 26 connected to receive pulses from the shaper 20 as one input and the output from a flip-flop 28 as the other input. The flip-flop 28 may comprise any of a variety of well-known bistable circuits and is directly connected to a manually-operable switch 30, which is in turn connected to a source of positive potential.

Upon manual closure of the switch 30, a positive signal is applied to reset all counters and also to place the flip-flop in a set state, whereby the output to the gate 26 remains high until the flip-flop is reset by receiving a high signal at its other input. Recapitulating, upon closure of the switch 30, the system is cleared, and the flip-flop 28 qualifies the gate 26, then upon the occurrence of a pulse from the shaper 20 indicating the beginning of a cycle, the monostable multivibrator 22 is triggered initiating the predetermined or measured time interval.

The flip-flop 28 also accomplishes another timing function, in cooperation with a flip-flop 32 which is pertinent the development of the fractional digit NF. The so-called "set" output from the flip-flop 28 is connected to an "and" gate 34 along with a similar output from the flip-flop 32. Additionally, the gate 34 receives clock pulses from a clock generator or source 36. The clock source 36 may comprise a very stable oscillator or other structure as well known in the prior art, to supply a reliable signal of high frequency in relation to the frequency of the signal under observation. The frequency and accuracy of the clock source 36 bear directly on the resolution of the signal under observation.

During the period when both the flip-flops 28 and 32 are set, the "and" gate 34 passes clock pulses to a "step" input of a counter 38. The counter 38 may be similar to the counter 26 as previously identified as well as to still another counter 40. These units as well known, may comprise a plurality of decade stages interconnected to tally pulses received at a "step" input. The content of the counters is cleared upon receipt of a pulse applied at a "clear" input.

Functionally, the counter 38 resolves one full cycle of the input signal into a denominator coinciding to the number of clock pulses provided from the source 36 during one cycle (the period) of the signal. The counter 40 then tallies the clock pulses from the source 36 occurring during the fragment of a cycle in the observed interval to develop the fraction. These functions are graphically apparent from a consideration of FIG. 1. The counter 26 tallies the intersections 14 to account for the fully cycles occurring during measured interval T. The counter 38 tallies and manifests the period of a single cycle of the waveform (period between points 14) forming the denominator of a fraction, the numerator of which is a similar measurement of the interval $t1$.

In view of the above preliminary description of the structure of FIG. 1, a complete understanding may now best be accomplished by explaining a complete sequence of operation along with the introductaion of the remaining operating elements. Therefore, assume the application of a signal at the input terminal 18 having a frequency of 2,783 and 21/324 cycles per second. Further, assume the monostable multivibrator 22 has an operating interval of one second and that the switch 30 is manually closed to initiate a sequence of operation.

First, the system awaits the beginning of a fresh cycle manifest by the leading edge of a pulse from the shaper 20. Thereupon, a flip-flop 28 (having been set by the switch 30) along with the pulse from the shaper 20 qualify the gate 26 to trigger the multivibrator 22. The gate 24 is then qualified and pulses from the shaper 20 are tallied by the counter 26.

Simultaneous with the closure of the switch 30, the flip-flop 32 is re-set through a connection or well-known "or" gate 41, to also await the start of a single cycle. Such an instant, manifest by a pulse from the shaper 20, is sensed by an "and" gate 42 which is qualified by the high reset output from the flip-flop 32 causing the flip-flop 32 to be set. Thereupon, a gate 34 (receiving the set inputs from both flip-flops 28 and 32) is qualified and passes clock pulses from the source 36 to be tallied in the counter 38. This counting is terminated on the completion of a single cycle of the input signal, at which instant, pulse from the shaper 20 passes through a "and" gate 44 (qualified by the set state of the flip-flop 32) to reset the flip-flop 32 as well as the flip-flop 28. In that manner, the denominator for the fractional measurement is accomplished in the counter 38.

The counter 40 for providing the numerator of the fraction is operative throughout the entire interval T. Specifically, the counter 40 tallies clock pulses during each full cycle, presumably to a count of 324, after which the cycle terminates, the counter 40 is cleared and pulses are tallied to resolve another cycle. Of course, the last full cycle is followed by a partial cycle, the magnitude of which is the last talley of the counter 40.

The operation of the counter 40 is accomplished by connecting it to continually count clock pulses from the source 36 then resetting the counter 40 upon the termination of each cycle of the input signal. Specifically, the output of the pulse shaper 20 is connected through the gate 24 to the "clear" input of the counter 40 for resetting that counter at the start of each cycle of the signal. The specific structure includes a connection from the gate 24 through a connection gate 46 to the "clear" input of the counter 40. A connection is then also provided from the clock source 36 through an "and" gate 47 (qualified by the multivibrator 22) to the "step" input of the counter 40. Thus, operation of the system, after the full cycles are counted, during the interval t1 (FIG. 1) 81 clock pulses are tallied in the counter 40 completing the fractional measurement. The counter 26 therefore manifests the number of full cycles while the counters 38 and 40 mutually manifest a fraction providing an accurate frequency measurement.

In many situations, fractional measurements are difficult to employ, particularly when such fractions include changing denominators. Additionally, operating hardware capable of complete decimal representation is readily available. Therefore, a need arises for a system in accordance herewith, which has the capability to provide an entirely-decimal output, e.g. a number of decimal digits, manifesting frequency. An exemplary embodiment of such a system is presented in FIG. 3 and will now be considered.

Referring now to FIG. 3, there is shown a trigger 50 substantially as previously disclosed to function as a pulse shaper for the input signal applied at the terminal 52. The system of FIG. 3 also includes a clock source in the form of a clock 54 for providing discrete and regular pulses at a rate much higher than the frequency rates to be measured, and for use in timing the operation of the system.

As another general consideration, the structure of FIG. 3 includes a separate scale-of-ten or decade counter for each digit of the numerical value that is to be indicated. Specifically, the scale-of-ten counters 56, 57, 58 and 59 are provided for respectively manifesting the digits N1, N2, N3 and N4 of the metered value. The scale of ten counters may simply comprise decade step counters as well known in the prior art including a "step" input and a "clear" input. Upon application of a pulse to the "clear" input the counter is then returned to indicate "zero"; then, upon the occurrence of each pulse at the "step" input the counters is advanced one digit.

In the operation of this system, the frequency of the input signal that is applied at the terminal 52 is developed digit-by-digit in the counters 56, 57, 58 and 59. The intervals during which the counters 56, 57, 58 and 59 are sequentially operated are established by output timing signals from a ring counter 60. Structures for the ring counter are well known, including a plurality of stages each of which provides an output to establish one of a group of signals M1, M2, M3 or M4 high during all operating intervals except the home position when signal H is developed high. The structure of the ring counter 60 is such that it may be reset to the "home" position by the application of a signal to a "clear" input, and is advanced to the next position by the application of a pulse to its "step" input.

The intervals defined by the individually-exclusively high states of signals M1, M2, M3 and M4 overlap to the intervals during which the digits N1, N2, N3 and N4 respectively are developed by each of the counters as indicated. The first operating interval (within the time the signal M1 is in a high state) is provided by a delay circuit 62 (drawing center). The system of FIG. 3 operates somewhat similarly to the previously-described system utilizing a flip-flop 64 (left center) to time the interval of operation. During that time, which is the actual counting period, the flip-flop 64 is set and the output signal M1 from the ring counter 60 is high. As a result, an "and" gate 66 is qualified to pass signals from the trigger 50 to the counter 56 and develop the first (most-significant) digit of the frequency measurement. The interval of the first period is terminated at the expiration of the delay incurred by the delay circuit 62.

During the following intervals, while the signals M2, M3 and M4 are in a high state and during which the scale of ten counters 57, 58 and 59 respectively are operated, the "and" gates 68, 70 and 72 are sequentially qualified, each of which functions to pass pulses from the trigger 50 to step an associated decade counter toward the accumulation of a value indicative of another decimal digit of the evenutal value which is manifest.

As indicated above, the first operating time interval, manifest by the signal M1 and the set state of the flip-flop 64 is provided by the delay circuit 62. However, the following operating intervals occurring within the high states of signals M2, M3 and M4 are accomplished by setting the flip-flop 64 coincident with the start of a cycle in the input signal (timed by a pulse from the trigger 50) then, during the following period step-clearing the content of a counter 74 until the counter is at zero. When a zero detector circuit 76 (cable connected to the counter 74) senses the counter 74 to be clear, resulting in a low level output in a conductor 80, a pulse generator 82 provides a pulse which is passed through connection gates 84 and 86 to step the ring counter 60 and reset the flip-flop 64.

The counter 74 may comprise a relatively well-known structure, having a "step" input and a "clear" input. A similar structure may be employed as a counter 88 the content of which is periodically shifted into the counter 74. In this regard, it is to be noted that the connections between the counter 88 and the counter 74 include a cable 90, a factor of ten unit 91, a gang "and" gate 92 and a cable 94. The cables 90 and 94 are connected with the unit 91, whereby to accomplish a multiplication of ten in the transfer. The unit 91 may comprise a variety of structures for multiplying the value from the counter 88 by a factor of "ten." Examples of such structures are shown beginning on page 139 of a book entitled "Arithmetic Operations In Digital Computers, by R. K. Richards, published by D. Van Nostrand Company Inc. in 1955. Of course, if decade stages are employed, such a coupling merely involves increasing the significance of the digits in connection from a counter 88 to the counter 74.

The "and" gang gate 92 in the transfer path may actually comprise a plurality of individudal "and" gates, each of which accommodates one binary digit of the transfer or a portion thereof, and each of which is qualified by the signal from the connection gate 84. Structure of this type is generally well known in the computer art and several alternatives are available.

In view of the above preliminary description of the system of FIG. 3, a complete understanding thereof may now best be accomplished by explaining the detailed steps of a cycle of operations, and concurrently introducing the remaining components of this system. Therefore, assume a signal is applied at the terminal 52 which signal is of a 3,125 cycle-per-second frequency. To initiate the measurement of that frequency, a manually-operated clear switch 92 (extreme right) is first closed supplying a positive signal to a junction point 94. The signal from the switch 92 is applied to several of the circuits in the system as counters and flip-flops, clearing such components for a cycle of operation. Specifically, the clear signal is applied to each of the scale-of-ten counters 56, 57, 58 and 59 to reset those counters to zero. Additionally, the signal from the junction point 94 is applied to the ring counter 60 setting that counter in the "home" position. Also, the "clear" signal is applied to clear the counter 74 and is applied through connection gates 96 and 98 to respectively clear flip-flops 64 and 100. Lastly, the signal is applied to clear the counter 88. Thus, all counters are cleared and flip-flops are in their proper initial operating state.

After releasing the switch 92, the next step involves manually depressing a start switch 102 (drawing center). Upon the closure of the switch 102 a positive signal is applied from a source of potential to set a flip-flop 100 and thereby qualify an "and" gate 106, which is also connected to receive pulses from the trigger 50. Upon the occurrence of the first pulse after the "and" gate 106 is qualified, the delay interval of the circuit 62 is initiated and concurrently a signal is applied through the connection gate 86 to step the ring counter 60 from the "home" position into the first position, in which the signal M1 is in a high state.

During the interval when the signal M1 is high, the "and" gate 66 (upper left) is qualified by that signal along with the output from the flip-flop 64 which was also set by the first pulse from the trigger 50, after reset. Therefore, each following pulse from the trigger 50 passes through the qualified "and" gate 66 to advance the counter 56 one step.

In the example hereof, the interval of the delay circuit 62 is .001 second, coinciding to the interval of the first operating period. Specifically, at the conclusion of the delay interval, the circuit 62 provides an output pulse to a conductor 110, which pulse is applied through connection gates 84 and 86 to advanve the ring counter 60 into the second stage, and to reset the flip-flop 64 through a connection gate 96. As a result, the gate 66 is disqualified and passes no more pulses. Note, that during this interval, the gate 68, though partly qualified by the signal M2 from the ring counter 60, is not qualified because the flip-flop 64 is in a reset state.

Summarizing, during the measured interval of .001 second, the most significant digit N1 is developed by the counter 56 as the decimal numeral 3. Additionally, a fractional cycle is also tallied. During an interval of .001 second, a 3,125 frequency, signal will undergo 3.125 cycles. The tally of the three full cycles is accomplished in the scale of ten counter 56. The .125 cycle is tallied in a counter 88 (lower left) as a time-equivalent number of clock pulses. That is, the period of .125 cycles of the signal under observation is metered by the contents of the counter 88 which manifests a numerical value equated to time by the frequency of the clock 54. The interval of the .125 cycle coincides to the time required by the clock 54 to provide a number of pulses coinciding to the content of the counter 88. The actual time interval as recorded is related to the period of the signal, .000320 second (1/3,125). As three cycles of the signal were observed, the interval consumed by full cycles is .000960 second (3×.000320). Therefore, the fractional cycle of observation amounted to .000040 second (.001−.000960).

Recapitulating, the counter 56 register "three" and the counter 88 at the present stage of operation holds a numerical value which when translated into time on the basis of clock pulses from the clock 54, amounts to .000040 second. That time interval is next expanded by the system and employed to provide the next interval of observation, manifest by a high value for the signal M2, during wnich the second digit of the metered value is developed in the counter 57.

This operation of expanding the time interval by a factor of exactly ten, is accomplished in structure during the transfer of the contents of the counter 88 through the cable 90, the unit 91, the gate 92 and the cable 94 into the counter 74. That is, the pulse count contained in the counter 88 is truly a manifestation of .000040 second and when multiplied by a factor of ten becomes a manifestation of .00040 second, the count currently held by the counter 74. This expansion of the radix employed accounts for the development of a less-significant digit.

The second interval is started (signal M2 high plus ocucurrence of a pulse from trigger 50) when the flip-flop 64 is again set. Pulses from the trigger 50 are now tallied in the counter 57. To define the duration, the count in the counter 74 times interval of .00040 second when translated into time by the clock 54. Specifically, the counter 74 is cleared one step at a time incrementally by the clock 54. That is, as long as the counter 74 has a content other than the zero, the zero detector 76 provides a high signal in an output line 80, Therefore, the output from the inverting pulse generator 82 is low and an "and" gate 114 (left) along with a similar gate 116 remain qualified. As a result, as frequency pulses are tallied by the counter 57 and clock pulses from the clock 54 are applied to reduce the content of the counter 74 and are tallied by the counter 88.

The interval of concern (.00040 second) is concluded when clock pulses from the clock 54 step the counter 74 back to zero. Pending that time, the counter 88 tallies clock pulses; during each cycle of the observed signal; however, is reset or cleared through the "and" gate 114 upon each occurrence of the period-ending pulse from the trigger 50. At the conclusion of the timed interval (.00040 second) the signal under observation (3,125 cycles/sec.) has accomplished only one cycle. That cycle is tallied as a pulse from the trigger 50 which passed through the gate 68 (now qualified) to advance the scale-of-ten counter 57 to decimal "one."

The second operating interval is terminated by the zero detector 76 sensing that the counter 74 is clear whereby to provide a low output, thereby disqualifying the gates 114 and 116. Additionally, the low output applied to the pulse generator 82 (which may comprise an inverter) results in the application of a signal through the connection gate 84 and the connection gate 86 to advance the ring counter 60. Still further, the pulse from the connection gate 84 is also applied to the "and" gate 92 whereby the contents of the counter 88 is transferred into the counter 74 preparatory to the third cycle of operations.

In summary, during the second stage of operation, manifest by the high state for the signal M2, tne scale-of-ten counter 57 accumulates a count of "one" and the interval of the remaining fragment of a cycle is registered in the counter 88 as previously described. That time is: .000400 −1 (.000320)=.000080 second. Again, the time is expanded by a factor of "ten" to define the third operating interval within the time of the signal M3.

The cycle as described above is repeated within the third interval manifest by a high value for the signal M3 and again within the fourth period which is manifest by a high value for the signal M4. The operations during these intervals may be seen to accomplish the digits in counters 58 and 59 representative of the frequency from the following analysis. The interval of the third period is expanded by a factor of ten to provide a time of .00080 second. During that interval the frequency under observation (3,125 cycles/sec.) completes two cycles plus a fraction, i.e. 3125×.000800=2+. The partial cycle is of .000160 second duration. The value of "two" is registered in the counter 58 while, as before, the value of .000160 is expanded by a factor of 10 to provide the fourth interval of operation. During the fourth interval of operation, the counter 59 tallies a value of "five" as, 3125× .001600=5.

In accordance with the assumed situation, the observed frequency of 3,125 cycles per second is now registered in the counters 56, 57, 58 and 59 as the digits N1, N2, N3 and N4. Of course, in the event additional digits of a value are desired, the repetitive operation described above is simply provided for additional scale-of-ten counters. In summary the process hereof involves countinsg the cycles of a signal under observation for a predetermined interval of time, and additionally accounting for the fragmentary period of the signal in which a partial cycle occurs. That fragmentary period may then be employed to provide an accurate indication of the frequency by various techniques as described above. Specifically, as shown with respect to FIG. 2, a fractional value may be relatively easily formed, or, as shown in FIG. 3, a system may be employed wherein the significance of decimal digits are accomplished by expanding the interval of operation by a factor of ten and tallying cycles during such an interval. In this regard, it is to be noted that by multiplying or expanding the time interval by a factor of ten, the significance of the digit being developed is reduced by the factor of ten. Of course, the system could be utilized with various numerals and numeral systems according to another radix. Therefore, it will be apparent to those skilled in the art that the systems described herein may be embodied in a wide variety of different specific structures, at wide variance from the details disclosed herein. Therefore, the system hereof is not to be limited other than by the claims appended hereto.

What is claimed is:

1. An instrument for metering the frequency of an electrical signal to manifest values thereof by representations in a numerical system with a predetermined radix comprising:

means for timing a first interval of observation; first counting means connected to receive said electrical signal and controlled by said means for timing, for manifesting the number of full cycles of said signal occurring during said first interval of observation as a first digit of the frequency value in said numerical system to indicate said frequency;

fractional cycle means, controlled by said means for timing, for sensing a second time interval coinciding to any fraction of a cycle in said signal occurring during said first interval of observation;

means for expanding said second time interval to a longer third time interval, by multiplication of said second time interval by the radix of said numerical system employed; and second counting means connected to receive said electrical signal and controlled by said means for expanding, for manifesting the number of full cycles of said signal occurring during said third time interval as a second digit of the frequency value in said numerical system to indicate said frequency.

2. An instrument according to claim 1 further including means for sensing additional time intervals of fractional cycles in said signal during intervals of observation; means for expanding said intervals by multiplication by said radix; and means for counting full cycles of said signal during such expanded intervals.

3. A system according to claim 1 wherein said number system is a decimal system and said counting means comprise decade counters.

4. A system according to claim 1 wherein said fractional cycle means includes a source of clock pulses and means for tallying said clock pulses during said fractional cycle.

5. A system according to claim 2, wherein said number system is a decimal system and said counting means comprise decade counters and wherein said fractional cycle means includes a source of clock pulse and means for tallying said clock pulses during said fractional cycle.

References Cited

UNITED STATES PATENTS

| 2,738,461 | 3/1956 | Burbeck et al. | |
| 2,928,046 | 3/1960 | Hansel | 324—79 |
| 2,992,384 | 7/1961 | Malbrain | 324—79 X |
| 3,315,253 | 4/1967 | Geller. | |

ALFRED E. SMITH, Primary Examiner

U.S. Cl. X.R.

324—68